C. J. COLEMAN.
ENGINE STARTER.
APPLICATION FILED AUG. 24, 1911.
1,192,826.
Patented July 25, 1916.
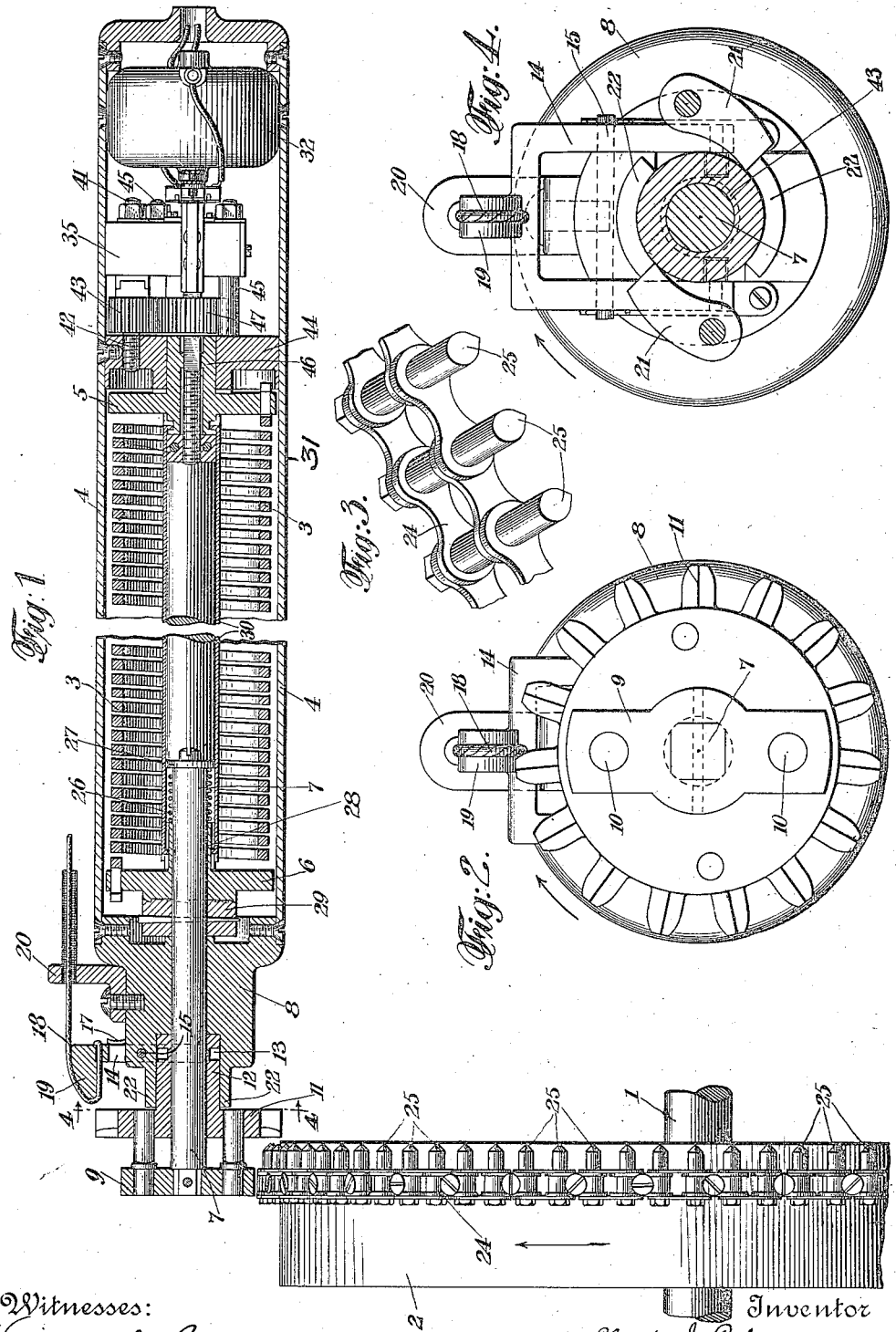
Witnesses:
Inventor
Clyde J. Coleman
By his Attorney

UNITED STATES PATENT OFFICE.

CLYDE J. COLEMAN, OF NEW YORK, N. Y., ASSIGNOR TO CONRAD HUBERT, OF WHITE PLAINS, NEW YORK.

ENGINE-STARTER.

1,192,826.  Specification of Letters Patent.  Patented July 25, 1916.

Application filed August 24, 1911. Serial No. 645,800.

*To all whom it may concern:*

Be it known that I, CLYDE J. COLEMAN, a citizen of the United States, residing in the borough of Manhattan, city of New York, in the county of New York and State of New York, have invented certain new and useful Improvements in Engine-Starters, of which the following is a specification, reference being had therein to the accompanying drawings, forming part thereof.

My invention relates to gearing and is particularly adapted for use in effecting engagement between an engine and a power-storing device for starting the engine.

Among the general objects of my invention are simplicity, compactness and durability of construction, and reliability and convenience of operation.

Other objects of my invention are the separate construction of the gearing and the ability to attach the same to the fly wheel of any engine.

A further object of my invention is that it enables any power-storing device adapted for use with my improved gear construction to impart its movement to an engine at any fly wheel or other wheel of the engine and avoids the necessity of providing a special fly wheel for an engine in connection with a starting device.

I shall now describe the embodiment of my invention illustrated in the accompanying drawing, and shall thereafter point out my invention in claims.

Figure 1 is a partial longitudinal elevation of the gearing embodying my invention, shown as applied to the fly wheel of an engine and in its relation to a power-storing device for starting the engine, the power-storing device being shown in section. Fig. 2 is an end elevation of the complementary member adapted to engage with the gearing on the fly wheel. Fig. 3 is a perspective view of a portion of the chain gear. Fig. 4 is a cross-sectional view taken on the line 4—4 of Fig. 1 looking toward the right.

My improved gear consists of a separate and removable band or chain provided with gear teeth or gear-tooth-engaging parts and is adapted to be removably secured about the periphery of a fly wheel.

In its illustrated form the gearing comprises a chain 24 composed of a succession of double links joined together by transverse studs 25 and secured to the fly wheel 2 by screws through the spaces between the pivots of the chain and screwed into the fly wheel. The chain is made as nearly as possible to fit the particular fly wheel to which it is to be attached, and the pitch is determined without calculation, by the links themselves, any looseness of fit on the fly wheel being taken up by a suitable bushing. The studs 25 project from the side of the chain 24 toward the movable gear wheel 11 hereinafter described. Since these chain gears are intended to be applied to fly wheels of various diameters, it is desirable that the pitch line of the teeth may be altered without affecting their ability to mesh with the teeth of the coöperating gear wheel, and this is accomplished by making the studs circular in cross-section, and it is apparent that, with such teeth, the diameter of the fly wheel may be changed at will. To facilitate meshing as the sliding gear wheel is moved forward, the ends of the studs 25 are tapered or pointed, and the forward edges of the gear teeth on the wheel and gear wheel 11 are beveled off as is shown in Fig. 2.

As heretofore stated, my improved gear construction is adapted to be used in connection with a power-storing device for starting an engine and the drawings illustrate such an application of my invention.

The power-storing device used to start the engine is an entirely independent structure which can be attached as an accessory, the only requirement being that a slidable transmitting gear on the starter be arranged so that it can be moved into mesh with my removable gear which is attached to the periphery of the fly wheel.

The illustrated starter consists of a helical torsional spring 3 coiled in tubular shape. This power spring, which is contained in a casing 4, is connected at its rear end to a winding disk 5 and at its front end to a starting disk 6.

The means for transmitting rotary motion from the starting disk 6 to the fly wheel 2 is as follows: The starting disk is mounted free to rotate on a forwardly extending rotary shaft 7, and is connected by face ratchet teeth to a ratchet 29 pinned to the shaft 7, thus imparting rotation to the shaft 7 in the direction of rotation of the power spring, and permitting the engine to speed ahead after the engine is started and before the power spring is disconnected from the fly wheel. An irregularly shaped head 8 forms a closure for the forward end of the casing 4 and serves as a bearing for the shaft 7. A gear wheel supporting member 9 is pinned to front squared end of its shaft 7, and is provided with two rearwardly extending guide pins 10, on which are slidably mounted a gear wheel 11 fitting over the shaft 7 so as to slide thereon and held by the pins 10 so as to rotate with the shaft, and having a rearwardly extending hub 12 provided near its rear end with a circumferential slot 13.

To slide the gear wheel 11 forward and back on the pins 10 and the shaft 7, a bifurcated member 14 is provided, which straddles the head 8 and is pivoted near the top thereof on a pivot pin 15. The sides of the head 8 are flattened at this point and the central bore which serves as a bearing for the shaft 7 is enlarged and serves as a guide for the hub 12. Each of the forks of bifurcated member 14 is provided at its lower end with a pin (not shown) which engages in the slot 13 in the hub 12 of the sliding gear 11, and it is apparent that, as the bifurcated member is rocked on its pivot pin 15, the gear wheel 11 will be caused to slide forward and back on the shaft 7 and pins 10. Flat springs 17, attached to the head 8 on shoulders formed by flattened faces on each side of the head, bear against the bifurcated member 14 above the pivot 15 and normally hold the gear 11 in retracted position. To slide the gear 11 forward into mesh with the gear teeth on the fly wheel 2, manually controlled means are provided consisting of a flexible cord 18 secured to the upper end of the bifurcated member 14 and passing over the head 19 on the top of the bifurcated member and through an opening in a lug 20 secured to the top of the head 8, and thence to connection with a foot pedal or other means under the control of the driver. It is apparent that, as a pull is exerted on the cord 18, the upper end of the bifurcated member 14 will be drawn back and the gear wheel 11 thus forced forward.

In retracted position, the gear wheel 11 is held against rotation by two dogs 21, which normally bear against the forwardly projecting reduced ends 22 of the stationary head 8. The gear wheel is so disposed relative to the fly wheel 2 that, as it is moved toward the fly wheel, its teeth mesh with those on the fly wheel before the dogs 21 clear the projecting ends or stop arms 22 and before the power spring is released and further movement causes the gear wheel to move further into mesh with the teeth on the fly wheel and at the same time release the dogs 21 from the arms 22. The rotation of the gear wheel 11 causes the dogs 21 to fly outwardly on their pivots by centrifugal force against stop pins (not shown) on the face of the gear wheels so disposed as to permit the dogs to fly outwardly far enough to clear the arms 22 as the gear wheel is retracted by the springs 17 and before it is moved out of mesh with the fly wheel. When the gear wheel is no longer rotated by the fly wheel, one or both of the dogs 21 fall by gravity and engage one or both of the stop arms 22 and thereby lock the spring 3 against further unwinding movement, so that power may be stored therein by means to be described hereinafter.

The power spring 3 tends to rotate the starting disk 6, and this rotative tendency is transmitted through the ratchet 29 and the shaft 7, the gear-supporting member 9 and pins 10 to the sliding gear 11: but in the position shown in the drawings, the gear wheel is restrained from rotation by the engagement of the dogs 21 against the arms 22 on the stationary head 8. It is manifest, however, that when a pull is exerted on the cord 18, the gear wheel is caused to slide forward on the guide pins 10, and the gear wheel will be free to rotate as soon as the dogs 21 have cleared the ends of the arms 22.

The pulling of the cord 18 both releases the gear 11 from non-rotative position and permits it to be rotated by the spring 3 through the connection previously described; and connects the gear wheel with the fly wheel so that the rotation of the gear wheel 11 is utilized in rotating the fly wheel and starting the engine.

The continued rotation of the fly wheel after the spring 3 has been completely unwound will rotate the ratchet 29, but is not transmitted to the spring due to the one way connection with the starting disk 6. The movement of the teeth of the ratchet over the teeth of the ratchet on the hub of the disk 6, however, tends to separate the two parts and a backward movement of the disk 6 on the shaft 7 is permitted by a coiled spring 26 surrounding the inner end of the shaft 7 and bears against a plate 27 on the inner ends of the shaft and against an inwardly extending hub 28 on the disk 6, and holds the starting disk 6 in yielding engagement with the ratchet 29. The hub 28 of the starting disk has a spline connection with a sleeve 30 which extends internally of the power spring 3, and which is provided at its rear end with a pin which engages in a circumferential slot 31 in the winding disk 5. Independent rotation of the winding disk 5 and of the sleeve 30 is thereby permitted.

A motor 32 is suitably connected to the winding disk 5 by means of a double worm contained in a gear bearing block 35, and is connected to the motor shaft and coupled to a stud 42 on which is mounted a pinion 43 which meshes with a pinion 47 fixedly secured to a hub 46 extending from the winding disk 5. The stud 42 is secured in a supporting disk 44 screwed into the tubular casing 4. The gear bearing block 35 is supported on the supporting disk 44 by means of rods 45 extending through the gear bearing block and screwed into the supporting disk 4.

The operation of the power spring may be used to automatically control the motor 32, in any suitable manner.

The starter is supported on suitable brackets in any convenient place, the only requirement being that the sliding gear 11 be so disposed that it can be moved into mesh with the gear teeth on the fly of the engine, but since these gear teeth may be attached so that they project in either direction, the starter may be placed as may be most convenient for the particular type of automobile to which it is attached, extending either forward or rearward of the fly wheel and at any suitable place in relation to the fly wheel.

It is apparent that my improved gear construction is adapted to and can be used for various other purposes where gearing is required.

It is obvious that various modifications may be made in the construction shown in the drawings and above particularly described within the principle and scope of my invention.

I claim:

1. A gear mechanism comprising two co-operative rotary members, one axially bodily movable to and from its complementary member, and a flexible member having gear teeth formed therein mounted on the periphery of one of said members and attached thereto and arranged to mesh with gear teeth on the complementary member.

2. A gear mechanism comprising two co-operative rotary members, one axially bodily movable to and from its complementary member, and a flexible member mounted on the periphery of one of said members and attached thereto and having gear teeth projecting from one edge thereof and arranged to mesh with gear teeth on the complementary member.

3. A gear mechanism comprising two co-operative rotary members, one axially bodily movable to and from its complementary member, and a flexible member mounted on the periphery of one of said members and attached thereto and having substantially round gear teeth projecting from one edge thereof and arranged to mesh with gear teeth on the complementary member.

4. A gear mechanism comprising two co-operative rotary members, one axially bodily movable to and from its complementary member and a chain member mounted on the periphery of one member and attached thereto and having studs projecting from one edge thereof arranged to mesh with gear teeth on the complementary member.

5. A gear mechanism comprising two co-operative rotary members, one axially bodily movable to and from its complementary member and a chain member mounted on the periphery of one member and attached thereto and having substantially round studs projecting from one edge thereof arranged to mesh with gear teeth on the complementary member.

In testimony whereof I have affixed my signature in presence of two witnesses.

CLYDE J. COLEMAN.

Witnesses:
  WM. ASHLEY KELLY,
  BERNARD COWEN.